Patented Jan. 16, 1934

1,943,655

UNITED STATES PATENT OFFICE 1,943,655

SPRAYER

Charles D. Cummings, Tully, N. Y., assignor to Syracuse Chilled Plow Company Inc., Syracuse, N. Y., a corporation of New York Application June 21, 1930. Serial No. 462,803

11 Claims. (Cl. 299—39)

My present invention relates generally to apparatus for spraying plants with solutions which are effective in destroying pests and diseases which attack the plants. The spraying solutions usually employed commonly contain lime or other solids in solution or in suspension, and in order for the spraying to be effective it is necessary that every part of the plants on all sides, from top to bottom, be wet with the solution. In order to achieve this result it is common to apply the solution or mixture by means of forcing it through small openings or nozzles under pressure, whereby the liquid breaks up into a fine mist. As long as the openings and nozzles are clean, the mist is complete and no part of the object being sprayed can escape being treated. Considerable difficulty is experienced, however, in the practical operation of spraying apparatus on account of the tendency of the small openings and nozzles to become clogged by sediment and undissolved solid particles remaining in the spraying solution. Some machines on the market today attempt to remedy this condition by inserting small screens immediately preceding each nozzle so that liquid reaching the nozzle must first pass through these screens. It has been found, however, that in a short time the screens themselves become clogged so that the particular nozzle or opening involved becomes useless, and the sprayer thereby rendered proportionately ineffective. Often these screens are hard to remove and difficult to clean so that they are frequently neglected which, obviously, cuts down the efficiency of the apparatus and may leave considerable parts of the plants unprotected. In addition, these small screens, being positioned near the nozzles where the pressure is somewhat reduced due to the lost friction head, serve immediately to cut down the flow to the nozzle whereupon particles in suspension and approaching the screens, are immediately precipitated, thus adding to the clogged condition of the screens. Furthermore, since the screens are positioned near the nozzles, they are usually of small dimensions so that they become clogged quickly and therefore require quite frequent cleaning. Since these screens are on a dead end, there is no way of cleaning the same without bodily removing them from the line.

The principal object of my invention is, therefore, the provision of an improved means and method for screening or straining spraying solutions during the spraying operation. More particularly, my invention is concerned with providing screens of large dimension and capacity and so arranging them in the liquid line that during the normal operation the screens are flushed to remove any sediment or solid particles adhering to the screens. In addition, I so position the screens that the flow to the nozzles pass upwardly therethrough, and hence any sediment or foreign particles stopped by the screens are on the under side of them and therefore subjected to the action of gravity whereby the particles fall from the screens, particularly when the flow of liquid therethrough is interrupted, thus making the screens substantially self-cleaning.

Briefly, I secure the above results by providing a number of distributing boxes or chambers of relatively large size, each having a screen therein of relatively large capacity, these screens being positioned in the upper part of the chambers. The distributing nozzles are mounted on the chambers and so arranged as to receive the flow from the upper portion of the chambers. These chambers are serially arranged and are connected by flexible pipe or hose, and the screen in each chamber is so positioned that as the liquid flows from one chamber to the other it passes along the screen and thereby flushes off the underside thereof. In addition, each time the flow of liquid is interrupted, the matter adhering to the bottom of the screens falls to the bottom of the chamber. Thus, all the sediment and foreign matter is swept toward the end chamber or box which is made removable and capable of being easily cleaned, and since this box or chamber serves to collect all the sediment and foreign matter stopped by all of the screens, it is seldom necessary to open any except the end box or chamber for cleaning purposes.

Another object of my invention is to mount the nozzles in groups and to support each group upon a transverse supporting bar by means of adjustable connections whereby the nozzles may be adjusted laterally on the bar to accommodate them to the spacing of the rows of plants being treated. A still further object of my invention is to provide a supporting bar for the spraying nozzles which is pivoted to the frame or liquid container so that in transporting the machine the overall width of the same may be reduced by swinging upwardly the laterally extending sections. Preferably, I provide a lateral pivoted section on each side of the machine so that a substantial number of rows may be treated at one time, each section being adapted to be swung upwardly when transporting the machine and provided with means for holding the sections in their upward position.

Other objects and advantages of my invention will be apparent to those skilled in the art after a consideration of the following detailed description of one preferred embodiment of my invention taken in conjunction with the accompanying drawings, in which.

Figure 1:
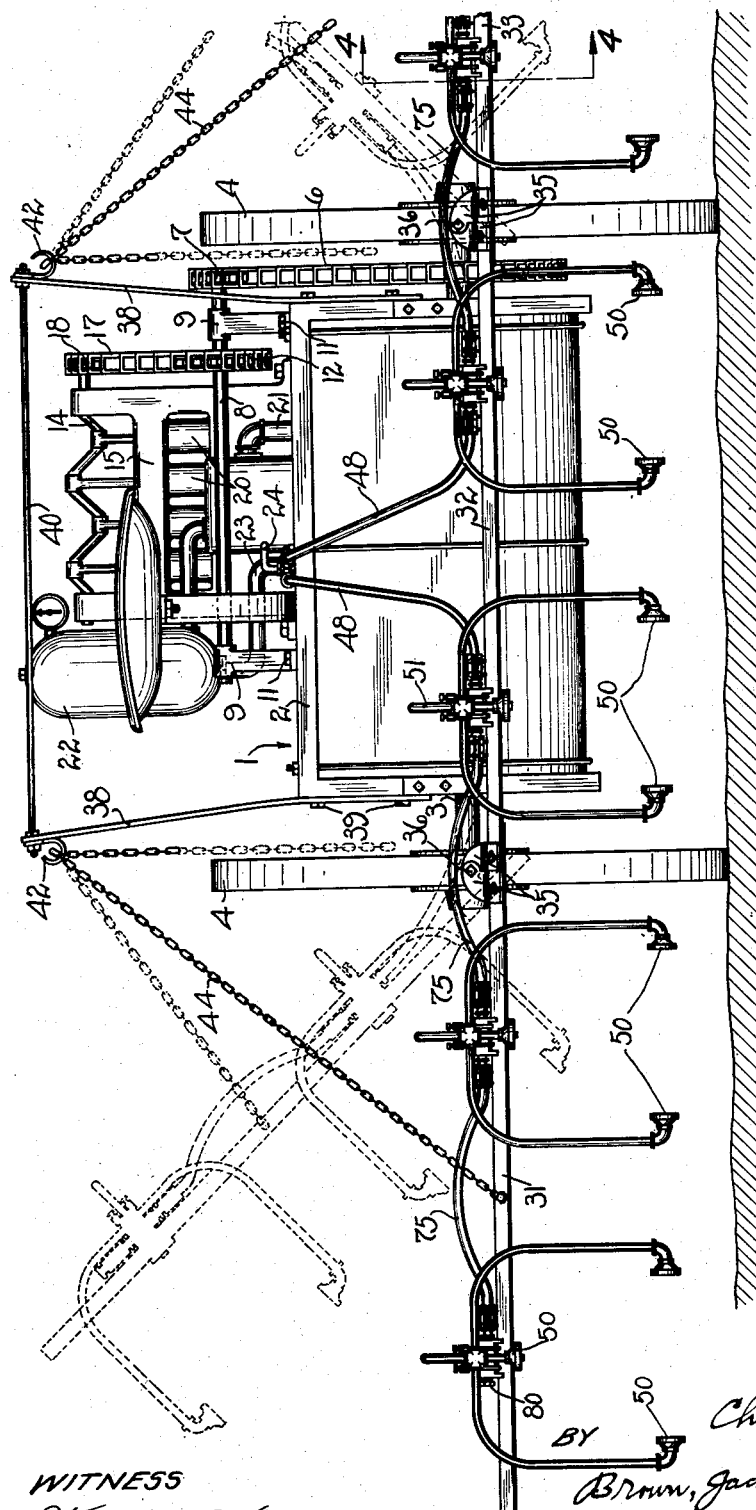
Figure 1 is a rear view of a spraying machine embodying my invention, one of the laterally extending sections being broken away, and showing in dotted lines the sections in one of their upwardly extending positions.
Figure 2:
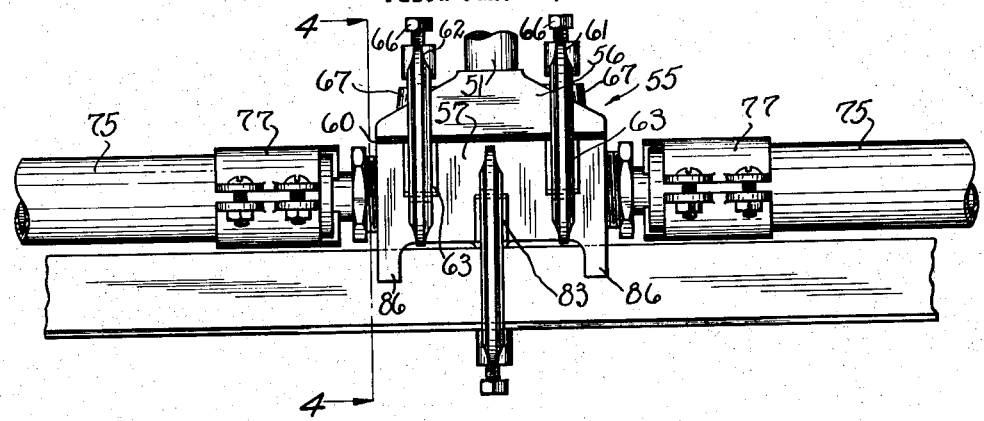
Figure 2 is an enlarged detail elevation showing one of the distributing boxes or chambers.
Figure 3:
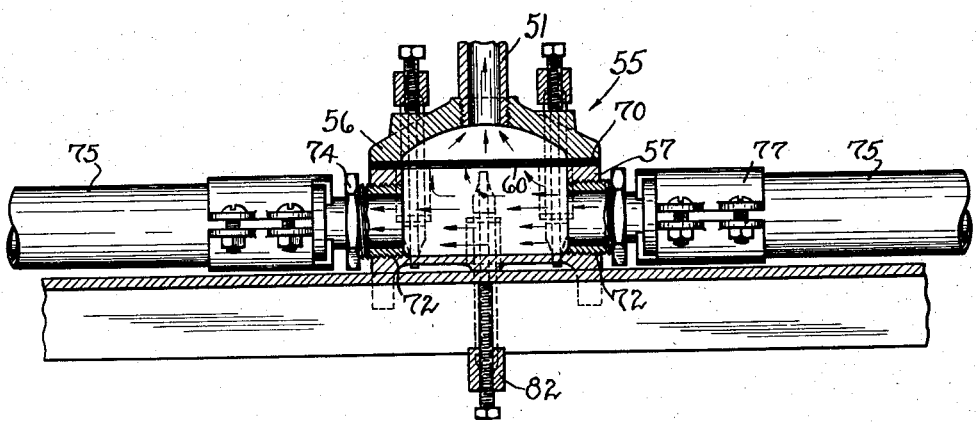
Figure 4:
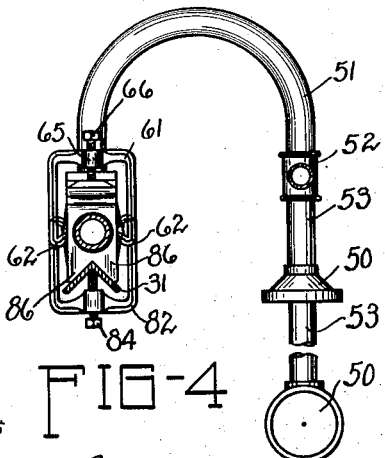

Figure 3 is a cross section of the distributing box or chamber shown in Figure 2; and Figure 4 is a cross section, somewhat reduced in scale as compared with Figures 2 and 3, and taken substantially along the line 4—4 of Figures 1 and 2.

Referring now to the drawings, the reference numeral 1 indicates the liquid container or tank which is carried by a supporting frame 2 and axle 3 and wheels 4. One of the wheels 4 has a sprocket mounted thereon and over which is trained a sprocket chain 6 operating over a smaller sprocket 7 mounted on a shaft 8 which is journaled on bearing brackets 9 supported on and secured, as by bolts 11, to the top of the tank or container 1. A driving sprocket 12 is fixedly secured to the shaft 8 and drives the crank shaft 14 of a pump 15 by means of a sprocket chain 17 and sprocket wheel 18.

The pump 15 may be of any desired construction, and is shown in Figure 1 as comprising a plurality of cylinders 20, an intake (not shown) an overflow relief 21, an air cushion 22 and an outlet 23. Valve means 24 serves to connect the outlet 23 with the nozzle system hereinafter more fully described.

The transverse supporting bar comprises three sections 31, 32, and 33, section 32 being rigidly secured to the frame 2 at a point in the rear of the wheels 4. The outer sections 31 and 33 are pivotally secured to the intermediate section 32 by means of hinge plates 35, each having apertured ears connected together by means of a pivot bolt 36. The hinge plates 35 are preferably bolted to the supporting bar sections, as best shown in Figure 1. Elongated brackets 38 are secured one at each side of the frame structure 2, as by bolts or rivets 39, and the upper ends of the brackets 38 are connected by means of a tie rod 40 extending from one side of the frame to the other. Hooks 42 are secured to the brackets 38 and are provided for the purpose of receiving and holding a link of the chain 44, the lower end of which is secured to one of the outer sections 31—33. As shown in Figure 1, a chain 44 is provided for each of the outer sections.

Flexible pipes or hose sections 48 lead downwardly from the valve 24 to the liquid distributing means which will now be described. A plurality of nozzles 50 are provided, these nozzles being arranged preferably in groups of three, one nozzle extending so as to direct the spray downwardly, while the other two nozzles are formed so as to direct the spray laterally in opposite directions, as best shown in Figure 1. Each group of three nozzles are supported in operative position by means of an inverted U-shaped pipe 51 threaded into one arm of a four-way fitting 52, the other three arms of the fitting 52 receiving the individual feed pipes 53 leading to the separate nozzles 50. The other end of the U-shaped pipe 51 is threaded into a distributing box or liquid chamber indicated in its entirety by the reference numeral 55.

The distributing box 55 is seen to comprise a top section 56 and a bottom section 57, and between the sections there is mounted a screen or strainer 60, as best shown in Figure 3. The top and bottom sections of the distributing box or chamber 55 are clamped together by means of U-shaped clamping yokes 61 having hooked ends 62 adapted to engage projections 63 formed on the bottom section 57. The clamping yoke 61 is formed with an intermediate boss 65 which is threaded to receive the set screw 66. The set screw 66 contacts with the shoulders 67 formed on the top section 56 so that when the set screws 66 are tightened the sections 56 and 57, together with the strainer or screen therebetween, are securely held together and in liquid tight relation, gaskets 70 being provided to seal the edges of the strainer or screen 60.

The lower portion or section of the liquid chamber 55 is provided with a pair of threaded openings 72, one at either end thereof and one providing an inlet and the other an outlet for the liquid passing through the chamber 55. Hose connections 74 are adapted to be threaded into the openings 72, and hose sections 75 are secured to each hose connection 74, as by means of clamps 77, as best shown in Figures 2 and 3.

Referring now to Figure 1, it will be observed that the machine shown is provided with six groups of nozzles 50 and there are, therefore, six distributing boxes or chambers 55 such as the one just described. The hose sections 75 connect three of these groups of nozzles in series with one of the hose sections 48 connected to the valve 24. The three groups of nozzles on the other side of the machine are connected to the valve 24 in an identical manner. The inner groups of nozzles receive liquid from the hose sections 48 first, then the liquid passes through the hose section 75 to the second group of nozzles, from whence the liquid passes through the second and outermost hose section 75 to the outer group of nozzles 50. Figure 3 illustrates the liquid passing through the lower portion of the distributing box or chamber 55 to the next outer chamber 55, the arrows indicating the direction of flow therethrough. The screen or strainer 60 is arranged just above the line of flow through the lower portion of the chamber 55 but close enough to be subjected to the sweep of the liquid across the underside thereof. Some of the liquid passes upwardly through the screen or strainer 60 and into the top section 56 of the distributing box and into the pipe 51 from which it is directed to each of the nozzles of the group supported thereby. The outlet 72 of the outermost box or chamber 55 is closed by means of a plug 80, as best shown in Figure 1.

By virtue of the fact that the liquid passes through the screens 60 in an upward direction in passing towards the nozzles, any sediment or foreign matter will be retained on the lower side of the screens 60 and in a position to be swept off by the flow passing through the distributing box to the next outer one. Also, being on the underside of the screen 60 the particles of sediment tend to fall to the bottom of the lower chamber as soon as the liquid flow through the screen diminishes or is interrupted. Thus, in operation, the liquid flow is utilized to flush and clean the screens, it being only necessary to clean at intervals the outermost boxes 55 since substantially all of the sediment and foreign matter is swept by the force of the liquid flow toward the outer end.

Each of the distributing boxes or chambers 55 is adjustably supported on the laterally extending sections 31 and 33 by means of a clamping yoke 82 similar to or substantially identical with the yoke 61. The hooked ends of the yoke 82 are adapted to engage lugs or projections 83 formed on the lower sections 57 of each of the boxes or chambers 55. A set screw 84, similar to the set screw 66, is threaded into the yoke 81 and is adapted to engage the supporting bar within the angle thereof, as best shown in Figure 4. The bottom of the lower section 57 is formed with sloping sides 86 whereby the distributing box 55 is securely supported on the laterally extending bars.

Each of the hose sections 75 is formed of flexible material so that the distributing boxes may be adjusted laterally along the supporting bars to accommodate those of varying distances apart. To position the nozzles for any particular row spacing, all that it is necessary to do is to loosen the set screw 84 of each distributing box 55 and then slide the same along the bar 31 or 33 until the nozzles of each group are properly positioned with respect to the plant rows.

It may be necessary when transporting the machine, particularly when passing through gates and the like, to reduce the overall width of the machine. This is easily accomplished by raising each of the outer supporting bar sections and securing it in its elevated position by engaging a link of the chain 42 over the hook member 42, as illustrated in dotted lines in Figure 1. The chains 44 in addition to serving as supporting means for the outer supporting bar sections when in their elevated position, also serve as means for supporting the weight of the outer sections and the groups of nozzles thereon.

While I have described in connection with the accompanying drawings one preferred embodiment of my invention, it is to be understood that my invention is not to be limited to the specific means shown and described, but that, in fact, widely different means may be utilized in the practice of the broader aspects of my invention.

What I claim, therefore, and desire to secure by Letters Patent is:—

1. A device for spraying liquid, comprising the combination with a container, a pump connected to the container, conduit means receiving the discharge from the pump, said means comprising a plurality of pipes serially arranged, of a plurality of distributing chambers each having a lower part in communication with adjacent pipes to pass the flow therethrough and an upper part, a horizontally disposed screen separating said parts for preventing particles carried by the fluid from passing to said upper part of the chamber, and a nozzle in communication with the upper portion of each chamber to receive screened liquid therefrom, the fluid passing through said chambers to the next succeeding chamber acting to flush off the screen to cleanse the same.

2. A device for spraying liquid, comprising the combination with a container, a pump connected to the container, conduit means receiving the discharge from the pump, said means comprising a plurality of pipes serially arranged in alignment, of a distributing chamber having a lower part in communication with adjacent pipes to pass the flow therethrough and an upper part, a screen separating said parts, clamping means securing the chamber parts together, and a nozzle in communication with the upper portion of the chamber to receive screened liquid therefrom.

3. A device for spraying liquid, comprising the combination with a container, a pump connected to the container, conduit means receiving the discharge from the pump, said means comprising a plurality of pipes serially arranged, of a plurality of distributing chambers each in communication with the contiguous ends of adjacent pipes to conduct the flow of liquid from one pipe to another, an upwardly opening aperture in each chamber, a horizontally disposed screen to prevent the passage of solid particles through each of said apertures, and nozzle means in communication with each aperture to receive the screened liquid flowing upwardly therefrom, the solid particles being retained on the lower side of each of said screens until swept away by the liquid flowing through that chamber.

4. A device for spraying liquid, comprising the combination with a container, a pump connected to the container, conduit means receiving the discharge from the pump, said means comprising a plurality of pipes serially arranged, of a support for the pipes, a plurality of distributing chambers carried by the supports and each in communication with the contiguous ends of adjacent pipes to conduct the flow of liquid from one pipe to another, an upwardly opening aperture in each chamber, a flat screen to prevent the passage of solid particles through each of said apertures, and nozzle means in communication with each aperture to receive the screened liquid flowing upwardly therefrom, the solid particles being retained on the lower side of said screens until swept away by the liquid flowing through the chambers, the outermost of said chambers being removable from the support so that material swept from the inner chambers can be removed therefrom.

5. In a sprayer adapted for use with row crops, the combination of a liquid container, a supporting frame therefor, transverse supporting bars pivoted to the frame to swing vertically and extending laterally on each side of the frame, a plurality of nozzle supporting chambers having members nonrotatably contacting said bars, clamping means cooperating with said members to secure the chambers to the bars in adjusted spaced positions along the bars in accordance with the row spacing, flexible conduit means connecting the chambers in series and in communication with the container, and a plurality of spraying nozzles supported by each chamber and receiving liquid flow therefrom.

6. In a sprayer adapted for use with row crops, the combination of a liquid container, a supporting frame therefor, transverse supporting bars pivoted to the frame to swing vertically and extending laterally on each side of the frame, a plurality of nozzle supporting chambers having members nonrotatably contacting said bars, clamping means embracing said bars and cooperating with said members to nonrotatably secure the chambers to the bars in adjusted spaced positions along the bars in accordance with the row spacing, flexible conduit means connecting the chambers in series and in communication with the container, an inverted U-shaped pipe in communication with the upper part of each chamber, and a plurality of spraying nozzles supported by the pipe and each chamber and receiving liquid flow therefrom.

7. In a sprayer having groups of nozzles, the combination of means for screening the liquid flowing to each group, comprising a distributing box having a liquid chamber in the lower portion, there being inlet and outlet openings in opposite ends of said portion and the chamber being open at the top thereof, a flat screen adapted to cover the top opening, a cover plate adapted to be secured over the screen and top opening, and means to place the group of nozzles in communication with the liquid chamber above said opening whereby only screened liquid flows to the nozzles, and conduit means connecting the outlet of one distributing box to the inlet of another whereby liquid in flowing to the outermost boxes passes through the preceding boxes, and in such passage flushes said screens.

8. In a sprayer of the class described having laterally extending supports, a plurality of distributing units on said supports, said units being connected in series and adapted to transmit liquid from one to the other, each of said units comprising a lower portion through which the liquid is transmitted to the lower portion of the adjacent unit and an upper portion receiving liquid from each lower portion, means to screen the liquid passing into said upper portion, and nozzle means connected to said upper portion for receiving screened liquid to be sprayed therefrom, whereby liquid will be transmitted in series through said units, said liquid in passing from one unit to the other acting to flush off said screening means and carry away any solid matter thereon.

9. In a sprayer of the class described having laterally extending supports, a plurality of distributing units on said supports, said units being connected in series and adapted to transmit liquid from one to the other, each of said units comprising a lower portion in communication with the lower portion of the adjacent unit for transmitting liquid in series through said units, and an upper portion covering an opening in said lower portion, a screen for preventing the passage of solid particles into said upper portion, nozzle means connecting said upper portion for receiving screened liquid to be sprayed, whereby liquid passing from unit to unit will flush off said screens and carry the solid particles from said units.

10. A device for spraying liquid, comprising the combination with a container, a pump connected to the container, conduit means receiving the discharge from the pump, said means comprising a plurality of pipes serially arranged in alignment, of a distributing chamber having one part in communication with adjacent pipes to pass the flow therethrough and a second part, a screen separating said parts, clamping means securing the chamber parts together, and a nozzle in communication with the second portion of the chamber to receive screened liquid therefrom.

11. In a sprayer having groups of nozzles, the combination of means for screening the liquid flowing to each group, comprising a distributing box having a liquid chamber in one portion, there being inlet and outlet openings in opposite ends of said portion, and the chamber being open at one side thereof, a screen adapted to cover the side opening, a cover plate secured over the screen and side opening, and means to place the group of nozzles in communication with the liquid chamber over said opening whereby only screened liquid flows to the nozzles, and conduit means connecting the outlet of one distributing box to the inlet of another whereby liquid, in flowing to the outermost boxes, passes through the preceding boxes and in such passage flushes said screens.

CHARLES D. CUMMINGS.